(12) United States Patent
Hirchenhein et al.

(10) Patent No.: US 10,598,116 B2
(45) Date of Patent: *Mar. 24, 2020

(54) METHOD FOR ASCERTAINING A CORRECTION VALUE FOR FUEL METERING OF A FUEL INJECTOR

(71) Applicant: Robert Bosch GmbH, Stuttgart (DE)

(72) Inventors: Achim Hirchenhein, Bietigheim-Bissingen (DE); Alexander Schenck Zu Schweinsberg, Moeglingen (DE); Klaus Joos, Walheim (DE); Eugenia Schwarz, Soest (DE); Timm Hollmann, Benningen A.n. (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/312,426

(22) PCT Filed: Jun. 1, 2017

(86) PCT No.: PCT/EP2017/063280

§ 371 (c)(1),
(2) Date: Dec. 21, 2018

(87) PCT Pub. No.: WO2018/001675

PCT Pub. Date: Jan. 4, 2018

(65) Prior Publication Data

US 2019/0331050 A1 Oct. 31, 2019

(30) Foreign Application Priority Data

Jun. 28, 2016 (DE) .......................... 10 2016 211 551

(51) Int. Cl.
*B60T 7/12* (2006.01)
*F02D 41/24* (2006.01)
(Continued)

(52) U.S. Cl.
CPC ............ *F02D 41/24* (2013.01); *F02D 41/402* (2013.01); *F02D 41/3836* (2013.01); *F02D 2200/0602* (2013.01); *F02D 2200/0614* (2013.01)

(58) Field of Classification Search
CPC ......... F02D 41/2467; F02D 2200/0602; F02D 19/024; F02D 35/0046; F02D 35/0069;
(Continued)

(56) References Cited

U.S. PATENT DOCUMENTS 10,378,474 B2 * 8/2019 Hirchenhein ....... F02D 41/2467
2018/0066598 A1 * 3/2018 Dusa ..................... F02D 41/064
(Continued)

FOREIGN PATENT DOCUMENTS

DE 102007050813 A1 4/2009
DE 102009002593 A1 10/2010
(Continued)

OTHER PUBLICATIONS

International Search Report for PCT/EP2017/063280, dated Sep. 1, 2017.

*Primary Examiner* — John Kwon
(74) *Attorney, Agent, or Firm* — Norton Rose Fulbright US LLP; Gerard Messina

(57) ABSTRACT

A method for ascertaining a correction value for fuel metering of a fuel injector of an internal combustion engine, in which fuel is injected from a high-pressure accumulator into a combustion chamber with the aid of the fuel injector, the fuel being injected into the combustion chamber in multiple separate injection procedures during one work cycle, a value representative of a static flow rate through the fuel injector being ascertained by ascertaining, for at least one of the multiple separate injection procedures, a ratio of a pressure change caused in the high-pressure accumulator by the at least one of the multiple separate injection procedures and an associated duration characteristic for the at least one of the multiple separate injection procedures being ascertained, (Continued)

and the correction value being ascertained based on a comparison of the representative value to a comparison value.

13 Claims, 3 Drawing Sheets

(51) Int. Cl.
*F02D 41/40* (2006.01)
*F02D 41/38* (2006.01)

(58) Field of Classification Search
CPC ............ F02D 35/0092; F02D 2700/02; F02M 2200/247; F02B 19/1052; F02B 19/1085
USPC ......... 701/101, 103–105; 123/294, 299, 304, 123/305
See application file for complete search history.

(56) References Cited

U.S. PATENT DOCUMENTS

| | | | | |
|---|---|---|---|---|
| 2018/0106208 A1* | 4/2018 | Hirchenhein | ....... | F02D 41/2467 |
| 2019/0145313 A1* | 5/2019 | Hirchenhein | ....... | F02D 41/1497 |
| | | | | 701/102 |
| 2019/0211763 A1* | 7/2019 | Hosaka | ................... | F02D 41/06 |

FOREIGN PATENT DOCUMENTS

| | | | |
|---|---|---|---|
| DE | 102010007171 A1 | 11/2010 |
| DE | 102014107903 A1 | 12/2015 |
| DE | 102014220274 A1 | 4/2016 |
| EP | 2796690 A1 | 10/2014 |

\* cited by examiner

METHOD FOR ASCERTAINING A CORRECTION VALUE FOR FUEL METERING OF A FUEL INJECTOR

FIELD OF THE INVENTION

The present invention relates to a method for ascertaining a correction value for fuel metering of a fuel injector of an internal combustion engine, in which fuel is injected from a high-pressure accumulator with the aid of multiple injection into a combustion chamber with the aid of a fuel injector, and a processing unit and a computer program for carrying out the method.

BACKGROUND INFORMATION

In motor vehicles, very strict limiting values to be observed partially apply with respect to emissions of pollutants. To observe present and in particular also future emission and/or exhaust gas limiting values, inter alia, accurate fuel metering during the injection is decisive.

However, it is to be considered that various tolerances occur during the metering. Such metering tolerances generally result from exemplar-dependent needle dynamics and exemplar-dependent static flow rates of the fuel injectors. An influence of the needle dynamics may be reduced, for example, by a mechatronic approach, for example, a so-called "controlled valve operation" (CVO). In "controlled valve operation", activation times of the fuel injectors are adapted over the service life of a motor vehicle, for example, in the sense of a regulation. The activation signal is detected during the injection and the opening duration of the valve needle is ascertained in parallel from opening and closing point in time. The actual opening duration of each injector may thus be computed and possibly corrected.

Such a method for regulating an actual opening duration of a valve to a setpoint opening duration is discussed in DE 10 2009 002 593 A1.

Possible errors in the static flow rate result from tolerances of the injection hole geometry and the needle lift. Such errors have heretofore usually only been able to be corrected globally, i.e., with respect to all fuel injectors of the internal combustion engine jointly, for example, on the basis of a lambda regulation or mixture adaptation. However, it thus may not be recognized whether individual fuel injectors of the internal combustion engine have a deviation with respect to their static flow rate (i.e., dispense different quantities with equal opening duration), which may be relevant to exhaust gas or smooth running.

A method for dispensing quantity monitoring of an injector controller of an internal combustion engine is discussed, for example, in DE 10 2007 050 813 A1, in which a fuel quantity dispensed by the injector is monitored on the basis of a pressure drop in the high-pressure accumulator. A detailed ascertainment of causes of possible deviations and their correction is not possible in this way, however.

SUMMARY OF THE INVENTION

According to the present invention, a method for ascertaining a correction value for fuel metering and a processing unit and a computer program for carrying out this method having the features of the independent patent claims are provided.

Advantageous embodiments are the subject matter of the subclaims and the following description.

A method according to the present invention is used for ascertaining a correction value for fuel metering of a fuel injector of an internal combustion engine, in which fuel is injected from a high-pressure accumulator into a combustion chamber with the aid of the fuel injector, the fuel being injected into the combustion chamber during one work cycle (i.e., working cycle) of the internal combustion engine in multiple separate injection procedures. In this case, this is a so-called multiple injection, in which fuel is introduced for combustion into the combustion chamber during a work cycle not only in a single injection, but rather in multiple separate injections. The number of the injections in one work cycle may be, for example, two or three. However, four or more injections are also conceivable. The reason for such a multiple injection, in which the total fuel quantity to be introduced, which is otherwise introduced in a single injection, is allocated into multiple injections, is, for example, better mixture formation in the combustion chamber.

A value representative of a static flow rate through the fuel injector is ascertained, by, for at least one of the multiple separate injection procedures, i.e., during at least one injection procedure of the multiple injections, a ratio being ascertained of a pressure change caused in the high-pressure accumulator by the at least one injection procedure and an associated duration characteristic for the at least one injection procedure. The value representative of the static flow rate through the fuel injector is thus a pressure rate.

Furthermore, the correction value is ascertained on the basis of a comparison of the representative value to a comparison value, for example, by quotient formation.

The correction value may be used for correction of a value for the static flow rate, the value being used in the ascertainment of setpoint durations or times which are characteristics for the injection procedures, for example, setpoint opening durations or setpoint activation durations. For example, the previous value for the static flow rate may be multiplied by the correction value. In particular, the correction may take place during the operation of a motor vehicle, in particular also regularly, or also during maintenance or another inspection.

The present invention makes use of the fact that the fuel quantity dispensed by a fuel injector during a single injection procedure and/or its volume is proportional or at least sufficiently proportional to the associated pressure change, i.e., the pressure difference before and after the injection procedure and thus a pressure drop in the high-pressure accumulator, the so-called rail. Due to the multiple injection, the chronological duration of the individual injection procedures is shorter than a conventional, single injection procedure, since the same fuel quantity is allocated to multiple injection procedures. If the associated pressure change may be detected or may at least be detected sufficiently accurately during a single one of the multiple injection procedures, the representative value may thus already be ascertained on the basis of this one injection procedure during the work cycle.

The value representative of the static flow rate through the fuel injector may be ascertained on the basis of at least two or all injection procedures through the relevant fuel injector during the particular work cycle or the multiple injection. This means that a total of the individual pressure changes caused by the particular injection procedures is ascertained. Due to the mentioned allocation to multiple injection procedures, it may be that the pressure change due to a single, very short injection procedure is very small and is therefore not measurable or ascertainable, at least not satisfactorily accurately. The detection or ascertainment of a pressure change caused by two or more injection procedures together, in contrast, is possible significantly more simply and accurately. It may be advantageous to ascertain the total of the pressure changes of all injection procedures of a multiple injection.

If moreover a duration characteristic for the at least one injection procedure is known, a value may be ascertained from the ratio of this pressure change and the associated duration which corresponds except for a proportionality factor to the static flow rate through the fuel injector. The duration characteristic for the at least one injection procedure may be applied in particular to such a duration as would occur during a single injection, in which the same fuel quantity is injected as with the aid of the at least one injection procedure. In other words, the characteristic durations of the individual injection procedures of the multiple injection may be converted in total to an equivalent of a single injection. In this way, possible delays during the closing and opening of the fuel injector may be taken into consideration.

It is advantageous in this case if, during the injection procedures, those procedures are prevented which change a pressure in the high-pressure accumulator in addition to the relevant injection procedures. This includes in particular the prevention or interruption of the further delivery of fuel into the high-pressure accumulator by a high-pressure pump. It is also to be ensured that no injection procedures are carried out in other combustion chambers. The pressure difference in the high-pressure accumulator due to the injection procedures otherwise possibly may not be detected sufficiently accurately or it will be corrupted. Possible leaks, which also result in pressure loss, in contrast, are not significant, in particular in the relative determination of the correction value, in which the representative value of a fuel injector is related to a mean value of corresponding representative values of all fuel injectors.

By taking into consideration the static flow rate, i.e., the injection quantity per unit of time in the full lift, the injection duration for injecting a desired injection quantity may be specified even more accurately. Since this method may be carried out for every fuel injector of the internal combustion engine, injector-specific deviations in the fuel metering, which may not be detected, for example, via a lambda measurement in the case of a global adaptation of the total injection quantity, may be corrected. Deviations in the needle dynamics (i.e., the opening and closing points in time), in contrast, may be corrected by a mechatronic method as mentioned at the outset. Therefore, suitable and accurate methods are available in each case for both factors influencing the fuel metering, needle dynamics and static flow rate.

The value representative for the static flow rate through the fuel injector is advantageously ascertained on the basis of at least two successive injection procedures of the relevant fuel injector during the particular work cycle. Successive injection procedures are to be understood in this case to mean that no further injection procedures, which are not taken into consideration in the ascertainment of the pressure change, lie between the observed injection procedures. It is advantageous if the pressure change is ascertained on the basis of a pressure in the high-pressure accumulator before a first and after the last of the at least two injection procedures. It is therefore no longer relevant whether the pressure changes caused by the individual injection procedures would be individually measurable or ascertainable, only the overall occurring pressure change has to be ascertained. The associated characteristic duration is, for example, an equivalent of a single injection, in which the same setpoint quantity is dispensed as would result as the total of the individual injections during the multiple injection, for example, in consideration of the total of the individual setpoint open times.

In particular, it is also possible in this case that a very short duration lies between the individual injection procedures, as is possible, for example, with the aid of piezoactuators in the fuel injectors. A detection of the pressure changes caused by the individual injection procedures would generally not be possible, even if the individual injection procedures cause a sufficiently large pressure change.

Alternatively, it may be provided that, if the pressure change is ascertained on the basis of individual pressure changes, which are caused by the respective injection procedures, each of the individual pressure changes being ascertained on the basis of a pressure in the high-pressure accumulator before and after the respective injection procedure. In this way, for example, an injection procedure lying between two individual injection procedures, whose pressure change is corrupted, for example, due to a simultaneous further delivery by the high-pressure pump or a simultaneous injection procedure into another combustion chamber, may be left out in the ascertainment of the pressure change.

The representative value is advantageously ascertained from ratios ascertained during multiple work cycles of pressure change and associated duration or from a mean value of ratios of pressure change and associated duration ascertained during multiple work cycles. Since the resulting accuracy is restricted in a single measurement of pressure change and duration characteristic for the injection, substantially more accurate values may be obtained by carrying out multiple measurements, which are related to one another in a suitable manner. Averaging, for example, is very simple and supplies an accurate value. A required number of measurements is mostly dependent on typical pulsations in the high-pressure accumulator and an accuracy of the sensor used for the pressure in the high-pressure accumulator.

It is advantageous if the correction value is ascertained on the basis of a ratio of the representative value and a mean value of corresponding representative values of all fuel injectors of the internal combustion engine. The method is thus independent of possible systematic measurement errors, for example, due to inaccurate sensors or missing pieces of information about the present fuel properties, for example, temperature or ethanol content. These influencing factors are also eliminated due to the quotient formation. The proportionality factor also does not have to be taken into consideration. In this regard, it is to be noted that the representative values of all fuel injectors are advantageously each ascertained in the same manner. If sufficiently many and sufficiently accurate sensors, for example, for the pressure in the high-pressure accumulator, medium temperature, and ethanol content, are used or may be used, an absolute value may thus also be ascertained for the static flow rate. The correction value may be ascertained on the basis of a ratio of this absolute value and a desired value as a comparison value.

The mean value of the corresponding correction values of all fuel injectors of the internal combustion engine may be set in such a way that a desired fuel-oxygen ratio in the exhaust gas is not changed. This fuel-oxygen ratio is also referred to as the lambda value. Therefore, for example, which may be optimal exhaust gas values of the internal combustion engine may be achieved.

Advantageously, at least one variable of actual opening duration (i.e., measured durations between particular opening point in time and closing point in time, for example, from the mechatronic approach with the aid of the above-mentioned "controlled valve operation"), setpoint opening duration (i.e., ideal model opening durations, i.e., non-measured opening duration), activation duration (i.e., duration in which activation signals are applied to the valve), and closing times (i.e., time from the end of the particular activation duration up to the end of the particular opening duration) is advantageously taken into consideration in the ascertainment of the duration characteristic for the injection procedure of the fuel injector. The actual opening durations are the values by which the duration of the fuel flow during the injection procedures is most accurately described, however, the other variables, possibly with a correction, may also be sufficiently accurate for the determination of the relevant duration of the injection procedures, above all they are in part very simple to ascertain. A combination of two or more of the mentioned variables may supply still more accurate values. The variables which are used may be made dependent, for example, on existing detection arrangements such as sensors or data in the activation electronics. The actual opening durations may be ascertained, for example, with the aid of the "controlled valve operation" mentioned at the outset, in which the injection duration is adjusted.

A processing unit according to the present invention, for example, a control unit of a motor vehicle, is configured, in particular by programming, to carry out a method according to the present invention.

The implementation of the method in the form of a computer program is also advantageous, since this involves particularly little cost, in particular if an executing control unit is also used for further tasks and is therefore present in any case. Suitable data carriers for providing the computer program are in particular magnetic, optical, and electrical memories, for example, hard drives, flash memories, EEPROMs, DVDs, etc. A download of a program via computer networks (Internet, intranet, etc.) is also possible.

Further advantages and embodiments of the present invention result from the description and the appended drawings.

The present invention is schematically shown on the basis of exemplary embodiments in the drawings and will be described hereafter with reference to the drawings.

DETAILED DESCRIPTION

Figure 1:
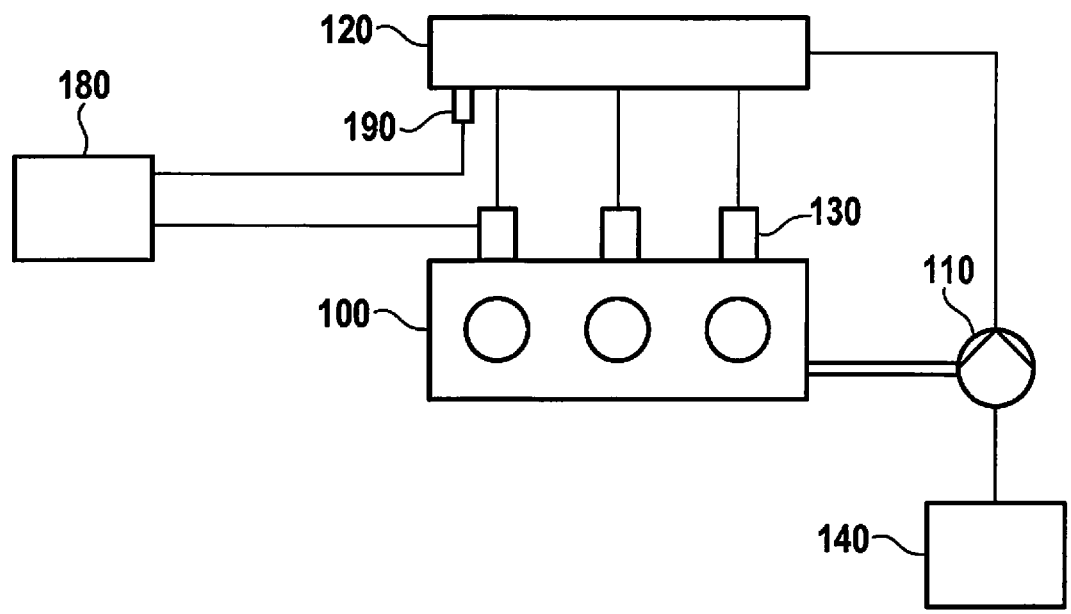
FIG. 1 schematically shows an internal combustion engine including a common rail system, which is suitable for carrying out a method according to the present invention.

FIG. 1 schematically shows an internal combustion engine 100, which is suitable for carrying out a method according to the present invention. By way of example, internal combustion engine 100 includes three combustion chambers and associated cylinders 105. A fuel injector 130, which is in turn connected in each case to a high-pressure accumulator 120, a so-called rail, via which it is supplied with fuel, is associated with each combustion chamber 105. It is understood that a method according to the present invention may also be carried out in an internal combustion engine including a different arbitrary number of cylinders, for example, four, six, eight, or twelve cylinders.

Furthermore, the high-pressure accumulator is fed with fuel from a fuel tank 140 via a high-pressure pump 110. High-pressure pump 110 is coupled to internal combustion engine 100, for example, in such a way that the high-pressure pump is driven via a crankshaft of the internal combustion engine, or via a camshaft, which is in turn coupled to the crankshaft.

Fuel injectors 130 are activated to meter fuel into particular combustion chambers 105 via a processing unit configured as an engine control unit 180. For the sake of clarity, only the connection of engine control unit 180 to one fuel injector 130 is shown, however, it is understood that each fuel injector 130 is connected accordingly to the engine control unit. Each fuel injector 130 may be activated specifically. Furthermore, engine control unit 130 is configured to detect the fuel pressure in high-pressure accumulator 120 with the aid of a pressure sensor 190.

Figure 2:
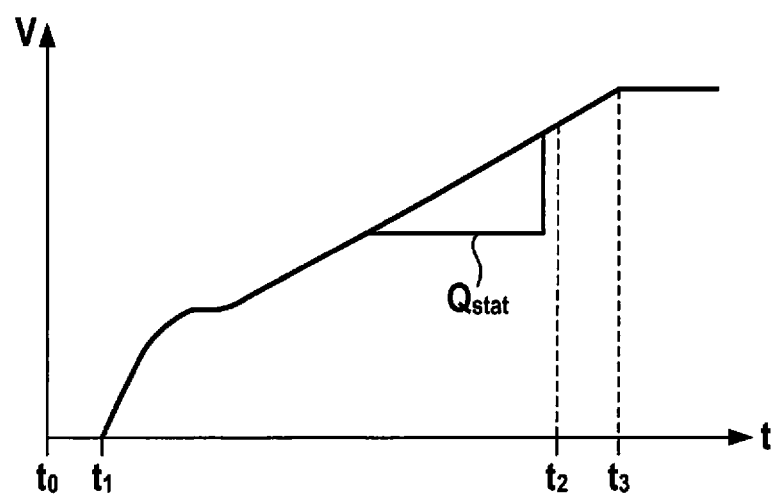
FIG. 2 shows a diagram of a flow volume in a fuel injector over time.

A cumulative flow volume V through a fuel injector over time t during a long-lasting activation of the fuel injector is shown in a diagram in FIG. 2. At point in time $t_0$, an activation time begins, and at point in time $t_1$ valve needle begins to lift. At point in time $t_1$ an opening duration of the fuel injector therefore also begins. It is apparent that the cumulative flow volume V or the fuel quantity which has flowed through the fuel injector rises constantly over a broad range after a short duration during the lifting of the valve needle. In this range, the valve needle is in so-called full lift, i.e., the valve needle is lifted completely or up to a setpoint height.

During this time, a constant fuel quantity per unit of time flows through the valve opening of the fuel injector, i.e., static flow rate $Q_{stat}$, which specifies the slope of cumulative flow volume V, is constant. The dimension of the static flow rate is an essential factor which, as already mentioned at the outset, determines the total fuel quantity injected during one injection procedure. Deviations or tolerances in the static flow rate therefore have an effect on the injected fuel quantity per injection procedure.

At point in time $t_2$, the activation time ends and the closing time begins. The valve needle begins to drop. The closing time and the opening duration end at point in time $t_3$, when the valve needle closes the valve again completely.

Figure 3:
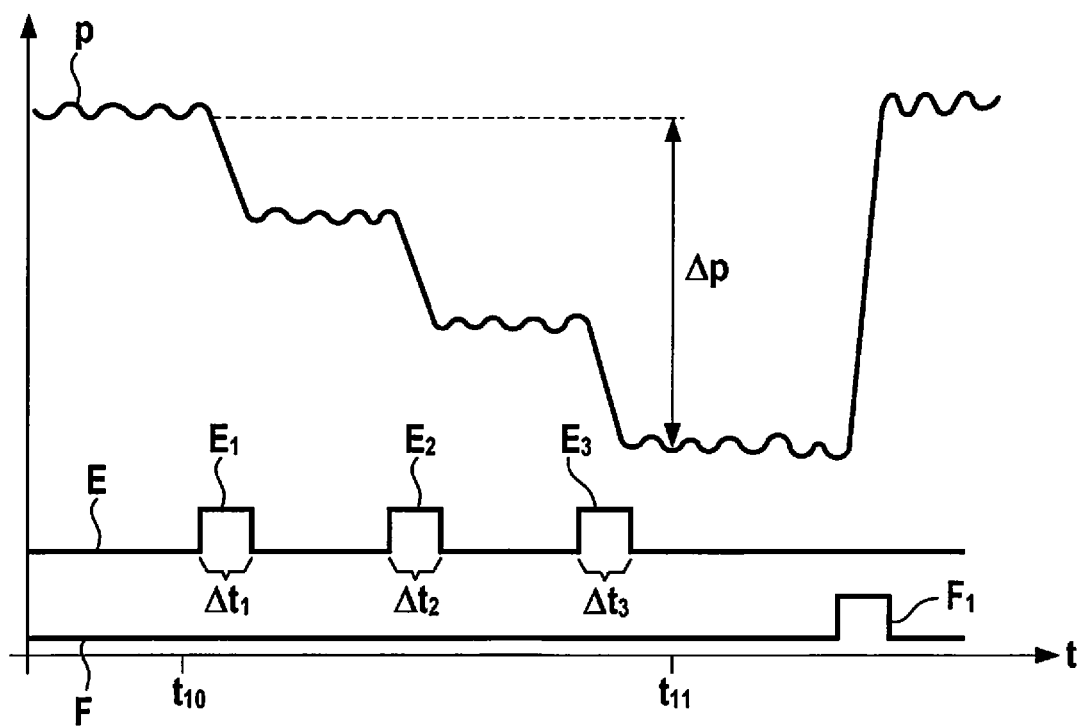
FIG. 3 shows a diagram of a pressure curve in a high-pressure accumulator during a multiple injection and an ascertainment of the associated pressure change in a method according to the present invention in one specific embodiment.

A pressure curve p in a high-pressure accumulator during a multiple injection is shown over time t in a diagram in FIG. 3. Moreover, a curve E including the individual injection procedures $E_1$, $E_2$, and $E_3$, which together form the multiple injection during one work cycle, is shown. Furthermore, a curve F of a delivery of the high-pressure pump including an active delivery phase $F_1$ is shown.

It is apparent in this case that pressure p in the high-pressure accumulator, aside from certain variations, is essentially constant. During each of injection procedures $E_1$, $E_2$, and $E_3$, which last a duration $\Delta t_1$, $\Delta t_2$, and $\Delta t_3$, respectively, pressure p in the high-pressure accumulator drops in each case by a specific value, therefore overall by a value $\Delta p$. The associated characteristics duration is an equivalent of a single injection, in which the same setpoint quantity is dispensed as the total of injections $E_1$ through $E_3$, for example, the total of individual setpoint opening times $t_1$ through $t_3$, results.

Pressure change $\Delta p$ is ascertained by ascertaining the pressure in the high-pressure accumulator in each case before the first injection procedure $E_1$, at point in time $t_{10}$, and after the last, third injection procedure $E_3$, at point in time $t_{11}$. Since active delivery phase $F_1$ of the high-pressure pump, whereby the pressure in the high-pressure accumulator is raised back to the starting level, here only after third injection procedure $E_3$, the pressure is not corrupted between the individual injection procedures and it is sufficient if the pressure change, as is caused by the injection procedures, is ascertained by the two mentioned measurements.

For this purpose, for example, the pressure change, as is caused by all individual injection procedures carried out during one work cycle, may be used to ascertain the representative value. Reference is made to the following statements for a more detailed description of the ascertainment of the representative value and the correction value.

Figure 4:
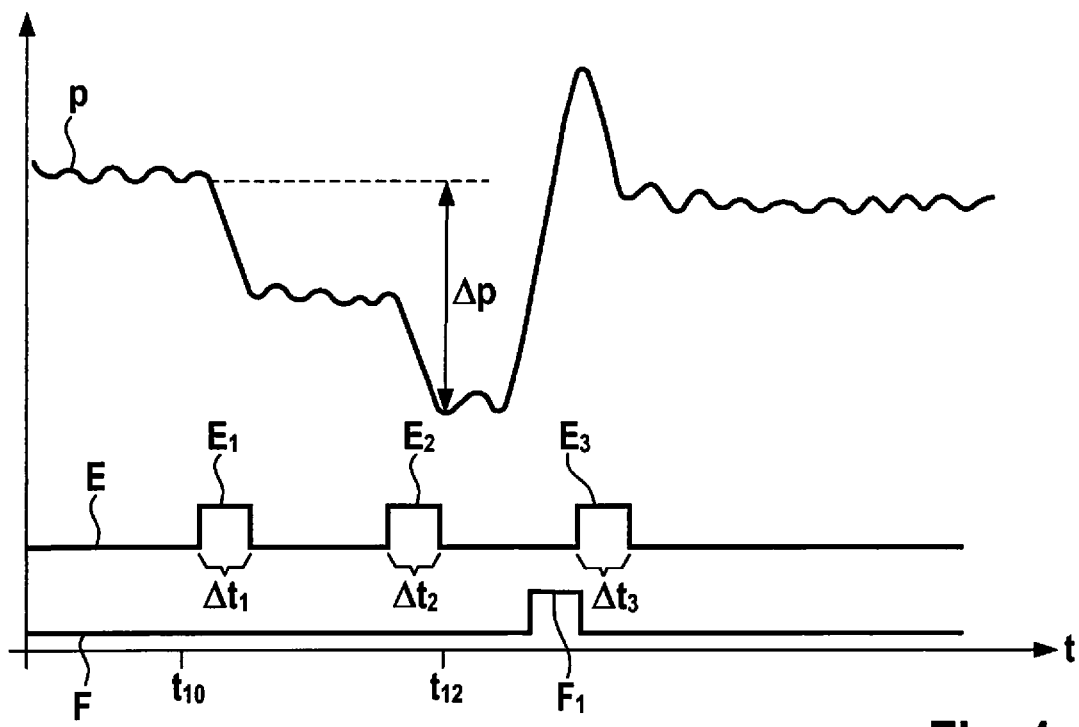
FIG. 4 shows a diagram of a pressure curve in a high-pressure accumulator during a multiple injection and an ascertainment of the associated pressure change in a method according to the present invention in another specific embodiment.

In FIG. 4, the situation shown in FIG. 3 is shown, but with the difference that active delivery phase $F_1$ of the high-pressure pump begins between second injection procedure $E_2$ and third injection procedure $E_3$ and only ends shortly after the beginning of third injection procedure $E_3$.

The pressure increase generated due to active delivery phase $F_1$ corresponds to that in FIG. 3. However, since it begins earlier, the pressure in the high-pressure accumulator initially rises above the starting level, but is brought back to the starting level with the last injection procedure.

Only pressure change $\Delta p$ caused by the two injection procedures $E_1$ and $E_2$ is ascertained, by ascertaining the pressure before first injection procedure $E_1$, at point in time $t_{10}$, and after second injection procedure $E_2$, at point in time $t_{12}$ here. Pressure change $\Delta p$ is less than in the case shown in FIG. 3, but a correspondingly shorter duration for the only two injection procedures is also used for the ascertainment of the representative value. The associated characteristic duration is, for example, an equivalent of a single injection, in which the same setpoint quantity is dispensed as results from the total of the two individual injection procedures, for example, the total of the individual setpoint opening times may be used for the computation for this purpose.

The situation represented in FIGS. 3 and 4 is shown in FIG. 4, but with the difference that active delivery phase $F_1$ of the high-pressure pump begins before the end of second injection procedure $E_2$ and ends between second injection procedure $E_2$ and third injection procedure $E_3$.

In contrast to the cases shown in FIGS. 3 and 4, at least two successive injection procedures are not provided here, the jointly caused pressure change of which could be ascertained. Rather, a pressure increase due to the active delivery phase of the high-pressure pump is present between the first injection procedure $E_1$ and third injection procedure $E_3$, which are uncorrupted per se with respect to the pressure change, the pressure increase being moreover overlaid by second injection procedure $E_2$. The individual pressure changes caused by first injection procedure $E_1$ and third injection procedure $E_3$ are identified with $\Delta p_1$ and $\Delta p_3$, respectively.

The two individual pressure changes $\Delta p_1$ and $\Delta p_3$ are ascertained separately, by ascertaining the pressure before first injection procedure $E_1$, at point in time $t_{10}$, and thereafter, at point in time $t_{13}$, and before third injection procedure $E_3$, at point in time $t_{14}$, and thereafter, at point in time $t_{15}$ here. Total pressure change $\Delta p$ caused by injection procedures $E_1$ and $E_3$ results—as shown—by addition of the two individual pressure changes $\Delta p_1$ and $\Delta p_3$.

In this regard it is to be noted that in the case of the ascertainment of the individual pressure changes for multiple, individual injection procedures, each of these individual pressure changes also has to be measurable or ascertainable, at least sufficiently accurately. If, for example, an individual pressure change caused by one of these two injection procedures should not be measurable or should not be measurable sufficiently accurately, only the one remaining pressure change having the corresponding duration may also be used to ascertain the representative value.

Figure 5:
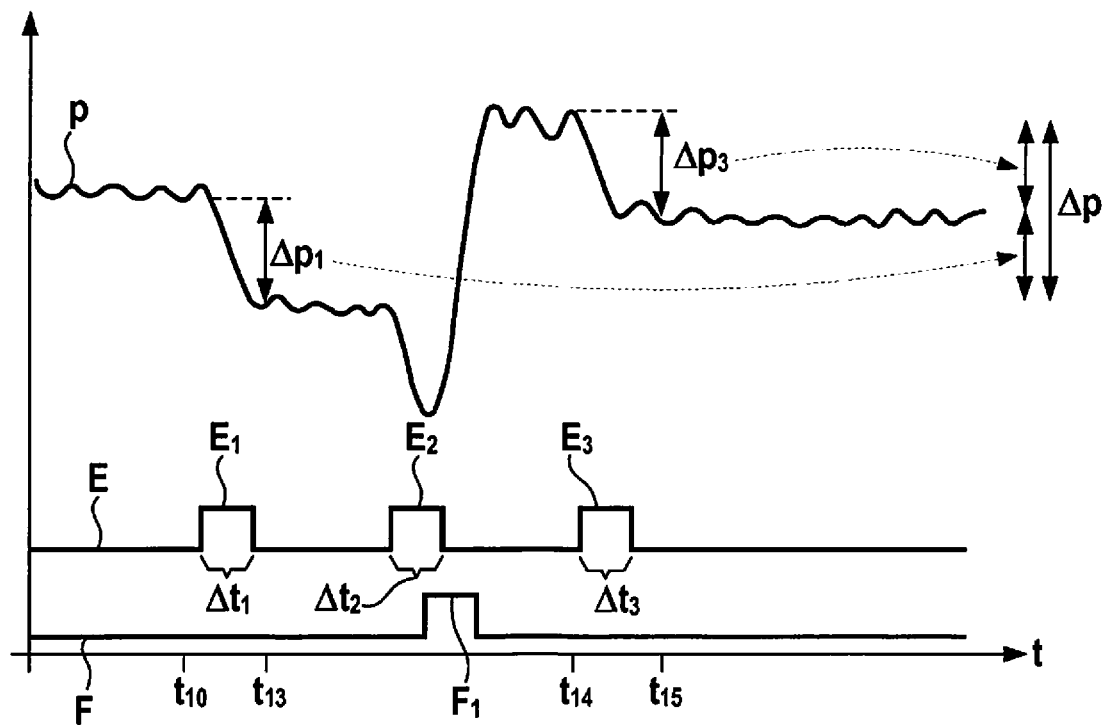
FIG. 5 shows a diagram of a pressure curve in a high-pressure accumulator during a multiple injection and an ascertainment of the associated pressure change in a method according to the present invention in a further embodiment.

The detection and analysis of these pressure changes shown in FIGS. 3 through 5 during the injection procedures is carried out using components typically present in any case, for example, pressure sensor 190 and engine control unit 180 including corresponding input wiring. Additional components are therefore not necessary.

This analysis is carried out individually for each combustion chamber 105 and therefore individually by injector. A metering variation between the combustion chambers is thus reduced and, for example, coked or defective injectors may be better identified, for example, in the repair shop (via a tester).

Static flow rate $Q_{stat}$ through the fuel injector is characterized, as already mentioned, by the injected fuel quantity or its volume per unit of time. In a high-pressure accumulator or rail pumped up (approximately) to system pressure, the injected volume is proportional to the pressure drop in the rail. The associated duration corresponds to the opening duration of the fuel injector, which may be determined, for example, as mentioned at the outset, mechatronically with the aid of "controlled valve operation".

It is to be noted that the individual durations of the individual injection procedures are advantageously not only added, but rather a duration is ascertained which would result if the fuel quantity were only injected with the aid of a single injection procedure. For this purpose, for example, corresponding models may be used and/or closing and opening times of the fuel injector may be taken into consideration.

By way of a quotient formation between pressure drop or pressure change $\Delta p$ and opening duration or duration of injection $\Delta t$, which approximately corresponds, for example, to $\Delta t_1 + \Delta t_2 + \Delta t_3$, a pressure rate is obtained as a replacement value or representative value $\Delta p/\Delta t$ for static flow rate $Q_{stat}$, i.e., for a measurement procedure i:

$$Q_{stat,i} \square \frac{\Delta p_i}{\Delta t_i}.$$

Since this replacement value for $Q_{stat}$ may generally only be determined with a certain accuracy using the components available in the system, a suitable method for refinement is advisable. This may be achieved, for example, by averaging or other mathematical methods with the aid of suitable software implementation. The determination error is reduced in the averaging with an increasing number of individual measurements.

Thus, for example, for n measuring procedures, the following results:

$$Q_{stat,i} \square \frac{1}{n} \sum_{j=1}^{n} \frac{\Delta p_{i,j}}{\Delta t_{i,j}}.$$

To achieve a required accuracy, a minimum number of measurements is necessary in this case. If the required number of measurements has been reached, an informative replacement variable for static flow rate $Q_{stat}$ is thus provided.

In this way, corresponding replacement variables or representative values may be formed for all injectors. Furthermore, the injector-individual correction is advantageously carried out in a relative manner, i.e., the injector-individual replacement variable is related to the mean value of the corresponding replacement variables of all fuel injectors as a comparison value. Due to this relative approach, the method is independent of, for example, absolute errors of the pressure sensor or the fuel temperature. In this way, for example, a correction value of the form $$K_i = \frac{Q_{stat,i}}{\overline{Q}_{stat}}$$

results with $$\overline{Q}_{stat} = \frac{1}{Z} \sum_{i=1}^{Z} Q_{stat,i}$$

with cylinder or injector number Z. It is also apparent in this case that possible proportionality factors or systematic measurement errors are eliminated upon the quotient formation.

A global average offset of static flow rate $\overline{Q}_{stat}$, i.e., an offset of the mean value of the static flow rates of all fuel injectors of the internal combustion engine is not corrected by this relative approach and is compensated for, as is also possible without correction of the static flow rate of individual fuel injectors, for example, by so-called lambda regulation or adaptation.

The correction value is used, for example, to correct the activation durations as setpoint durations characteristic for the injection procedure, by a value for the static flow rate used during the ascertainment of the activation durations being multiplied by the correction value. This is carried out, for example, in the form of a factor which has a separate conversion factor in the chain of computation from setpoint fuel quantity to activation duration of each fuel injector, i.e., an injector-specific value results for the particular static flow rate.

The described correction of the static flow rate supplies particularly accurate results if the influences of the needle dynamics are minimized or at least reduced by an underlying method, for example, "controlled valve operation", and therefore a nearly linear relationship is present between the injected volume of fuel and a measurable time (opening duration). The two greatest metering errors, namely errors in the needle dynamics and in the static flow rate, may therefore be compensated for physically correctly using a separate method in each case.

An optimal equality of the metering accuracy of all fuel injectors may be provided by a combination of both methods. In systems having sufficiently accurate pressure, temperature, and media detection, an absolute observation is possible, which does not require a correction via a measurement of the fuel-oxygen ratio, for example, with the aid of a lambda regulation, as already mentioned.

Figure 6:
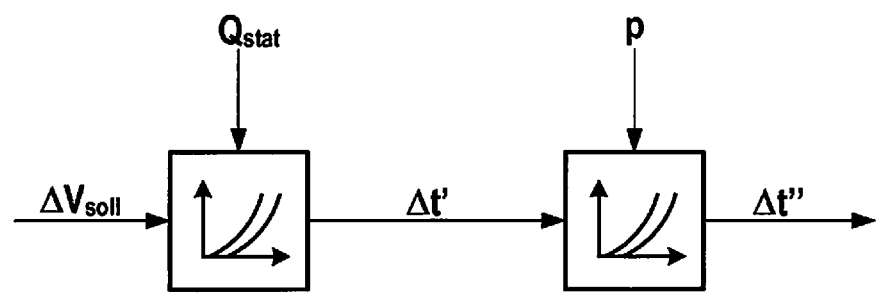
FIG. 6 schematically shows a sequence for ascertaining an activation time for a fuel injector.

FIG. 6 schematically shows a sequence for ascertaining an activation time $\Delta t''$ for a fuel injector on the basis of a value $Q_{stat}$ for a static flow rate. A setpoint opening duration $\Delta t'$ for the fuel injector is ascertained from a setpoint injection quantity $\Delta V_{setpoint}$ and value $Q_{stat}$, possibly corrected using an ascertained correction value, for the static flow rate, in a simple embodiment according to a proportionality law. Activation time $\Delta t''$, in which the fuel injector is activated, is ascertained from setpoint opening duration $\Delta t'$ and pressure p in the high-pressure accumulator, which may be done with using characteristic maps.

What is claimed is:

1. A method for ascertaining a correction value for fuel metering of a fuel injector of an internal combustion engine, in which fuel is injected from a high-pressure accumulator into a combustion chamber with the fuel injector, the method comprising:
    injecting the fuel in multiple separate injection procedures into the combustion chamber during one work cycle of the internal combustion engine;
    ascertaining a value representative of a static flow rate through the fuel injector by ascertaining, for at least one of the multiple separate injection procedures, a ratio of a pressure change caused in the high-pressure accumulator by the at least one of the multiple separate injection procedures and an associated duration characteristic for the at least one of the multiple separate injection procedures being ascertained; and
    ascertaining the correction value based on a comparison of the representative value to a comparison value.

2. The method of claim 1, wherein the value representative of the static flow rate through the fuel injector is ascertained based on at least two of the multiple separate injection procedures.

3. The method of claim 2, wherein the value representative of the static flow rate through the fuel injector is ascertained based on at least two successive of the multiple separate injection procedures.

4. The method of claim 3, wherein the pressure change is ascertained based on a pressure in the high-pressure accumulator before a first one and after a last one of the at least two of the multiple separate injection procedures.

5. The method of claim 2, wherein the pressure change is ascertained based on individual pressure changes, which are caused by the particular injection procedures, each of the individual pressure changes being ascertained based on a pressure in the high-pressure accumulator before and after the particular injection procedure.

6. The method of claim 1, wherein the representative value is ascertained from ratios of pressure change and associated duration ascertained during multiple work cycles or from a mean value of ratios of pressure change and associated duration ascertained during multiple work cycles.

7. The method of claim 1, wherein the correction value is ascertained based on a ratio of the representative value and a mean value of corresponding representative values of all fuel injectors of the internal combustion engine.

8. The method of claim 1, wherein at least one variable of actual opening duration, setpoint opening duration, activation time, and closing time of the fuel injector is taken into consideration in the ascertainment of the duration characteristic for the at least one of the multiple separate injection procedures.

9. The method of claim 1, wherein the correction value is used to correct a value for the static flow rate used in the ascertainment of setpoint durations characteristic for the injection procedures.

10. A processing unit for ascertaining a correction value for fuel metering of a fuel injector of an internal combustion engine, in which fuel is injected from a high-pressure accumulator into a combustion chamber with the fuel injector, comprising:
- a processor configured to perform the following:
    - injecting the fuel in multiple separate injection procedures into the combustion chamber during one work cycle of the internal combustion engine;
    - ascertaining a value representative of a static flow rate through the fuel injector by ascertaining, for at least one of the multiple separate injection procedures, a ratio of a pressure change caused in the high-pressure accumulator by the at least one of the multiple separate injection procedures and an associated duration characteristic for the at least one of the multiple separate injection procedures being ascertained; and
    - ascertaining the correction value based on a comparison of the representative value to a comparison value.

11. A non-transitory computer readable medium having a computer program, which is executable by a processor, comprising:
- a program code arrangement having program code for ascertaining a correction value for fuel metering of a fuel injector of an internal combustion engine, in which fuel is injected from a high-pressure accumulator into a combustion chamber with the fuel injector, by performing the following:
    - injecting the fuel in multiple separate injection procedures into the combustion chamber during one work cycle of the internal combustion engine;
    - ascertaining a value representative of a static flow rate through the fuel injector by ascertaining, for at least one of the multiple separate injection procedures, a ratio of a pressure change caused in the high-pressure accumulator by the at least one of the multiple separate injection procedures and an associated duration characteristic for the at least one of the multiple separate injection procedures being ascertained; and
    - ascertaining the correction value based on a comparison of the representative value to a comparison value.

12. The computer readable medium of claim 11, wherein the value representative of the static flow rate through the fuel injector is ascertained based on at least two of the multiple separate injection procedures.

13. The method of claim 1, wherein the correction value is ascertained based on a ratio of the representative value and a mean value of corresponding representative values of all fuel injectors of the internal combustion engine, and wherein the mean value of the corresponding correction values of all fuel injectors of the internal combustion engine is set so that a desired fuel-oxygen ratio in the exhaust gas is not changed.

* * * * *